United States Patent
Charles et al.

(10) Patent No.: US 11,807,567 B2
(45) Date of Patent: Nov. 7, 2023

(54) PRODUCTION OF GLASS FROM A MIXTURE COMPRISING CALCIUM OXIDE, AND GLASS FURNACE

(71) Applicant: ARC FRANCE, Arques (FR)

(72) Inventors: Herve Charles, Arques (FR); Jean-Marie Bonningues, Arques (FR); Sebastien Donze, Arques (FR); Francois Famchon, Arques (FR); Xavier Ibled, Arques (FR)

(73) Assignee: ARC FRANCE, Arques (FR)

( * ) Notice: Subject to any disclaimer, the term of this patent is extended or adjusted under 35 U.S.C. 154(b) by 183 days.

(21) Appl. No.: 16/625,953

(22) PCT Filed: Jun. 29, 2018

(86) PCT No.: PCT/FR2018/051626
§ 371 (c)(1),
(2) Date: Dec. 23, 2019

(87) PCT Pub. No.: WO2019/002802
PCT Pub. Date: Jan. 3, 2019

(65) Prior Publication Data
US 2020/0156980 A1    May 21, 2020

(30) Foreign Application Priority Data
Jun. 30, 2017  (FR) ...................................... 1756138

(51) Int. Cl.
*C03B 9/38*     (2006.01)
*C03B 5/235*    (2006.01)
(Continued)

(52) U.S. Cl.
CPC .............. *C03B 5/2353* (2013.01); *C03B 3/00* (2013.01); *C03C 1/026* (2013.01)

(58) Field of Classification Search
None
See application file for complete search history.

(56) References Cited

U.S. PATENT DOCUMENTS 2,084,328 A    6/1937  Ells, Jr. et al.
2,239,880 A *  4/1941  Curll, Jr. ................. C01B 33/32
                                                        423/334
(Continued)

FOREIGN PATENT DOCUMENTS

CA    2673495 A1   6/2008
CN    1516680 A    7/2004
(Continued)

OTHER PUBLICATIONS

Soda Solvay Chemicals international (Year: 2011).*
Richard L Lehman et al: "Glass Batch Wetting With Water", Glass Industry, vol. 58, No. 12, Dec. 1, 1977, pp. 16-24, XP001253940.

*Primary Examiner* — Jodi C Franklin
(74) *Attorney, Agent, or Firm* — Volpe Koenig

(57) ABSTRACT

The invention relates to a glass production method comprising the production of a glass precursor mixture for a glass furnace, in which water, sand and sodium carbonate are mixed in weight proportions of between 0 and 5%, 40 and 65%, and greater than 0 and at most 25% respectively, and, after at least 10 minutes, calcium oxide is added in a weight proportion of between 1 and 20% of the total. The invention relates to a method for producing glass using a mixture containing, in particular, calcium oxide, and a glass melting furnace, said method and furnace using a burner with a flame directed at the glass batch.

24 Claims, 6 Drawing Sheets

(51) Int. Cl.
*C03B 3/00* (2006.01)
*C03C 1/02* (2006.01)

(56) References Cited

U.S. PATENT DOCUMENTS

| | | | |
|---|---|---|---|
| 3,314,748 A * | 4/1967 | Port | C01D 7/35 |
| | | | 423/426 |
| 3,441,396 A * | 4/1969 | Eustachio | C03C 11/007 |
| | | | 65/22 |
| 3,511,629 A * | 5/1970 | Bauer | C03C 1/004 |
| | | | 65/134.3 |
| 3,542,534 A * | 11/1970 | Yamamoto | B01J 2/00 |
| | | | 501/72 |
| 3,545,988 A * | 12/1970 | Slade | C03B 1/02 |
| | | | 501/29 |
| 3,589,885 A * | 6/1971 | Monks | C03C 1/02 |
| | | | 65/134.3 |
| 3,630,673 A * | 12/1971 | Mod | C03C 1/026 |
| | | | 423/594.15 |
| 3,682,666 A * | 8/1972 | Lacourrege | C03B 1/02 |
| | | | 501/29 |
| 3,870,496 A * | 3/1975 | Cutler | C03C 11/007 |
| | | | 65/22 |
| 3,967,943 A * | 7/1976 | Seeley | C03C 1/00 |
| | | | 65/27 |
| 4,028,131 A * | 6/1977 | Pons | C03C 1/00 |
| | | | 501/29 |
| 4,110,097 A * | 8/1978 | Chevallier | C03B 5/173 |
| | | | 65/134.3 |
| 4,243,423 A * | 1/1981 | Hohman | C03C 1/026 |
| | | | 501/29 |
| 4,349,366 A * | 9/1982 | Saeman | B01J 2/12 |
| | | | 264/113 |
| 4,479,778 A | 10/1984 | Blanchet et al. | |
| 4,526,603 A * | 7/1985 | Lehman | C03C 1/028 |
| | | | 501/27 |
| 4,539,030 A * | 9/1985 | Demarest, Jr. | C03B 3/023 |
| | | | 65/27 |
| 4,844,753 A * | 7/1989 | Katayama | C23C 22/74 |
| | | | 148/251 |
| 4,920,080 A * | 4/1990 | Demarest, Jr. | C03C 1/026 |
| | | | 501/31 |
| 5,395,806 A * | 3/1995 | Adams, Jr. | C01F 11/185 |
| | | | 106/463 |
| 5,431,992 A * | 7/1995 | Houpt | D02G 1/18 |
| | | | 442/353 |
| 5,674,616 A * | 10/1997 | Balcar | C03C 12/02 |
| | | | 428/402 |
| 6,395,205 B1 * | 5/2002 | Huege | C04B 28/18 |
| | | | 264/42 |
| 6,422,041 B1 | 7/2002 | Simpson et al. | |
| 6,780,801 B1 * | 8/2004 | Sakai | C03C 1/00 |
| | | | 501/27 |
| 7,507,388 B2 * | 3/2009 | Ceylan | C01D 7/10 |
| | | | 423/206.2 |
| 9,051,199 B2 | 6/2015 | Dewet-Smith et al. | |
| 10,597,325 B2 * | 3/2020 | Chun | C04B 28/04 |
| 2003/0052434 A1 * | 3/2003 | Hockman | C03C 1/026 |
| | | | 264/115 |
| 2004/0204304 A1 * | 10/2004 | Hockman | C03C 1/026 |
| | | | 501/27 |
| 2005/0022557 A1 * | 2/2005 | Carty | C03B 1/02 |
| | | | 65/135.9 |
| 2005/0096209 A1 * | 5/2005 | Kase | C03C 1/00 |
| | | | 501/56 |
| 2007/0098610 A1 * | 5/2007 | Ingram | C03C 1/02 |
| | | | 423/155 |
| 2007/0245854 A1 * | 10/2007 | Lynch | C01B 33/037 |
| | | | 75/406 |
| 2009/0277225 A1 * | 11/2009 | Mangan | C03C 1/022 |
| | | | 65/66 |
| 2010/0242545 A1 * | 9/2010 | Richardson | C03B 5/2353 |
| | | | 65/335 |
| 2010/0255980 A1 * | 10/2010 | Fulton | C03C 1/00 |
| | | | 501/65 |
| 2011/0132230 A1 * | 6/2011 | Han | C04B 28/008 |
| | | | 106/600 |
| 2011/0302962 A1 * | 12/2011 | Gattermann | C03B 5/225 |
| | | | 65/29.21 |
| 2012/0216574 A1 * | 8/2012 | Dewet-Smith | C03B 5/2252 |
| | | | 65/134.2 |
| 2013/0095261 A1 * | 4/2013 | Ahn | C03C 3/06 |
| | | | 428/34.4 |
| 2014/0024518 A1 * | 1/2014 | Leese | C03B 5/00 |
| | | | 501/29 |
| 2018/0354841 A1 * | 12/2018 | Kun | C03C 1/026 |
| 2018/0362380 A1 * | 12/2018 | Weil | C03B 1/02 |
| 2019/0382303 A1 * | 12/2019 | Grimm | C03B 17/04 |
| 2020/0156980 A1 * | 5/2020 | Charles | C03B 3/00 |
| 2021/0094859 A1 * | 4/2021 | Wang | C03B 5/225 |
| 2021/0147276 A1 * | 5/2021 | Chaudhari | C03C 11/007 |
| 2021/0340047 A1 * | 11/2021 | Fava | C03B 5/005 |
| 2021/0380464 A1 * | 12/2021 | Charles | C03C 3/091 |

FOREIGN PATENT DOCUMENTS

| | | |
|---|---|---|
| CN | 1558874 A | 12/2004 |
| CN | 101993084 A | 3/2011 |
| CN | 102424392 A | 4/2012 |
| CN | 103492326 A | 1/2014 |
| CN | 106517738 A | 3/2017 |
| CN | 106565096 A | 4/2017 |
| EP | 0355618 A2 | 2/1990 |
| EP | 1236691 A2 | 9/2002 |
| JP | S5436312 A | 3/1979 |
| JP | S55100236 A | 7/1980 |
| JP | S6036312 A | 2/1985 |
| JP | H08208240 A | 8/1996 |
| JP | 2001220150 A | 8/2001 |
| SU | 1222636 A1 | 4/1986 |
| WO | 9012760 A1 | 11/1990 |
| WO | 2002092521 A1 | 11/2002 |
| WO | 2003057636 A1 | 7/2003 |
| WO | 2008064790 A1 | 6/2008 |

* cited by examiner

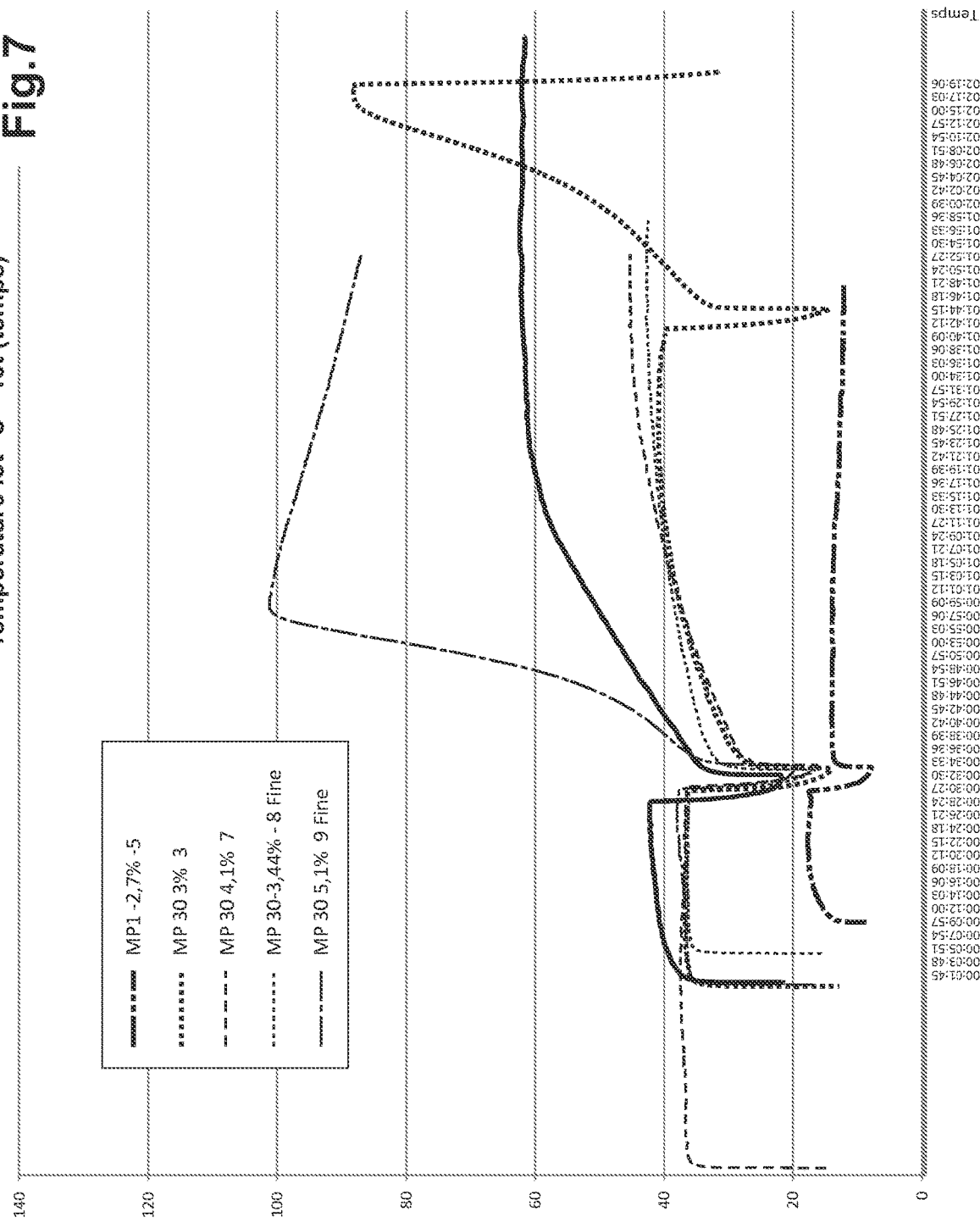

PRODUCTION OF GLASS FROM A MIXTURE COMPRISING CALCIUM OXIDE, AND GLASS FURNACE

FIELD OF THE INVENTION

The invention relates to the field of the glassmaking industry. Melting of the materials which constitute glass requires the input of a large amount of energy. The temperature of the glass bath is of the order of 1300 to 1500° C. Depending on its composition, the glass is intended for direct household use, for example drinking glasses, glazing, or indirectly, for example vitroceramic hobs, or industrial use.

BACKGROUND

The furnace is subjected to very high thermal and mechanical stresses. The furnace is constructed with high-quality refractory coatings. The refractory coatings are expensive and sensitive to certain constituents of glass that are liable to undergo chemical reaction. Since the refractory coatings are poor heat conductors, the heating of the glass bath is performed from the top.

A liquid or gas fuel flame burner is placed between the glass bath and the top of the furnace known as the crown. The glass bath is heated essentially by radiation. The gas outlet temperature is from 1300 to 1600° C. depending on the glass family.

Moreover, the manufacture of glass releases large amounts of gas. The glass bath is degassed for several hours to avoid the formation of bubbles in the glass. To facilitate the degassing, refining additives such as sulfates may be used. The furnace functions in glass batches of chosen composition.

The outlet gases, derived from the degassing and from the combustion, are evacuated via a chimney.

The Applicant pursued the objective of a major reduction in energy consumption relative to the mass of glass produced.

In a soda-lime glass, the main starting materials are limestone, soda, for example in the form of sodium carbonate $Na_2CO_3$ and silica in the form of quartz sand. The limestone and the sodium carbonate release $CO_2$ during the refining of the glass.

JPS55100236 describes the use of slag for the purpose of manufacturing glass. However, many technical obstacles are not addressed. The Applicant has no knowledge of an industrial implementation of such technology.

U.S. Pat. No. 2,084,328 describes a glassmaking furnace charge produced from dolomite and kaolin mixed under wet conditions. The dolomite and kaolin slurry is calcined and then mixed with soda ash, sand and quicklime.

US 2005/0022557 describes an $Na_2CO_3$ and $SiO_2$ premix in parallel with a $CaCO_3$ and $SiO_2$ premix with prereaction, followed by mixing of the two premixes and of additional $SiO_2$, followed by introduction into a glassmaking furnace.

US 2012/0216574 relates to a process for making glass comprising the calcination of $CaCO_3$ to form CaO, the formation of a liquid-phase $Na_2SiO_3$ glass, and the liquid-phase mixing of the CaO and $Na_2SiO_3$ to form a soda-lime glass.

Moreover, the Applicant is aware of a seminar "Glass Trend Seminar" of Oct. 18 & 19, 2012 in Eindhoven, where Hande Sesigür, Melek Orhon and Banu Arslan from the company SISECAM presented a document "Alternative Raw Materials for Improving the Melting Properties in Glass Production" which reports a test of introduction of calcined lime into a glassmaking furnace, resulting in a slight reduction in energy consumption, easier melting, an increase in the specific load of the furnace, but at a higher cost price per ton of glass produced, with the strong presence of batch dusts above the glass bath, increased corrosion of the furnace walls and problems of adhesion between particles.

The Applicant performed tests. Replacing limestone with quicklime in glass manufacturing materials poses difficulties, notably associated with the reactivity of quicklime with atmospheric moisture. The economic balance of lime is less favorable than that of limestone, despite a reduced transported and handled tonnage. Moreover, a lime with a large particle size is slow to melt in the glass bath and may leave unmelted materials. A lime with a small particle size gives rise to batch dusts pulled along with the combustion gases. A portion of the lime is lost and fouls the fume pipes downstream of the furnace.

Despite these obstacles, the Applicant continued and developed a glass precursor mixture. A difficulty arose during the preparation of the mixture. In the absence of water, the pulverulent mixture has no consistency and generates a large amount of batch dusts. However, water and lime react together exothermically. The temperature reached makes the mixture difficult to handle.

SUMMARY

The Applicant has developed a process for preparing a precursor mixture providing a mixture with low heating and with low generation of batch dust. The particle size of the constituents introduced into the mixture is substantially conserved, apart from the fact that the mechanical transfer handling operations may give rise to a milling effect which slightly reduces the particle size. Said mixture introduced into a glassmaking furnace allows a reduction in the energy required to produce the glass and in the amount of $CO_2$ released of the order of 3 to 6%. Moreover, the melting time of the mixture is less than that observed when calcium carbonate is used. This results in an increase in the productivity of the furnace, also reflected in an additional reduction in the energy consumption of the order of 4 to 6%.

The invention proposes a process for manufacturing glass comprising the preparation of a glass precursor mixture for a glassmaking furnace, in which water, sand and sodium carbonate are mixed in mass proportions of between 0 and 5%, 40% and 65%, and more than 0 and not more than 25%, respectively, and, after a time of at least 10 minutes and of less than one hour, calcium oxide is added in a mass proportion of between 1% and 20% of the total.

The invention proposes a process for manufacturing glass comprising the preparation of a glass precursor mixture for a glassmaking furnace, in which water, sand and sodium carbonate are mixed in mass proportions of between 0 and 5%, 40% and 65%, and more than 0 and not more than 25%, respectively, and, after a time of at least one hour, calcium oxide is added in a mass proportion of between 1% and 20% of the total. The preparation of the precursor mixture does not undergo any significant spontaneous heating or, at the very least, any heating liable to be a drawback. The delay in introducing calcium oxide leaves the sodium carbonate the time to take up the available water, notably that in the sand. The Applicant realized the advantage there would be in dispensing with the chemical reaction involving lime before the furnace treatment.

In one embodiment, the mass proportion of water is between 1.5% and 3%. The risk of generating batch dusts, even with mixture fractions of small particle size, is reduced.

In one embodiment, said delay is at least one hour.

In one embodiment, said delay is between at least 10 minutes and less than one hour for a mixture of water, sand and sodium carbonate containing not more than 4.1% moisture.

In one embodiment, the sodium carbonate has a particle size with less than 5% passing through a 0.075 mm screen, less than 15% passing through a 0.150 mm screen and less than 5% not passing through a 0.600 mm screen.

In one embodiment, said mixture of water, sand and sodium carbonate has not more than 3% moisture with sodium carbonate having a particle size predominantly greater than 0.500 mm and less than 1.000 mm.

In one embodiment, said mixture of water, sand and sodium carbonate has not more than 2% moisture with sodium carbonate predominantly having a particle size of less than 0.250 mm.

In one embodiment, said delay is less than 72 hours.

In one embodiment, the initial temperature of the starting materials is at least 30° C. The rate of hydration of the sodium carbonate is increased.

In one embodiment, the calcium oxide has a particle size such that 70% to 90% by mass does not pass through a 0.1 mm screen, preferably 30% to 80% by mass does not pass through a 0.5 mm screen, more preferably 30% to 70% by mass does not pass through a 2 mm screen. The generation of batch dust is low.

In one embodiment, the calcium oxide has a particle size such that more than 90% by mass does not pass through a 0.1 mm screen and less than 5% by mass does not pass through a 4 mm screen, preferably more than 95% by mass does not pass through a 0.1 mm screen and less than 1% by mass does not pass through a 4 mm screen. The amount of air introduced into the furnace with the mixture is low and unmelted matter is rare.

In one embodiment, the calcium oxide has a mean particle size of between 1 and 1.5 mm.

In one embodiment, the precursor mixture is used in a glassmaking furnace less than 1 hour after its preparation for a particle size of 90% or more by mass passing through a 0.1 mm screen, preferably less than 2 hours after its preparation for a particle size of 70% to 90% by mass passing through a 0.1 mm screen. A fine particle size is associated with high reactivity and rapid implementation. The melting is then rapid.

In one embodiment, the precursor mixture is used in a glassmaking furnace less than 8 hours after its preparation for a particle size of 70% or more by mass passing through a 2 mm screen. A mean particle size allows flexible implementation with industrially advantageous storage times.

In one embodiment, said sand is dry. The amount of water introduced is well controlled. In the variant without introduction of water, preferably associated with a medium or high particle size, the energy consumed is reduced. The sand is considered to be dry at a moisture content of less than 0.1%. The sand may be dried by heating from 15 to 20° C. above the ambient temperature.

In one embodiment, water is present in said sand, preferably 3% to 4% by mass. The cost of deliberate introduction of water is avoided.

In one embodiment, the calcium oxide is free of deliberate addition of aluminum oxide. Aluminum oxide may be introduced during the mixing of the water, sand and sodium carbonate.

In one embodiment, cullet is added to the glass precursor mixture, before or after the addition of calcium oxide, in a mass proportion of between 5% and 40% of the total. The cullet may originate from declassified glass batches. The batches are of known composition so that the amounts of the other raw materials is adjusted to the desired glass quality.

In one embodiment, the glass precursor mixture is prepared in the solid state. Evaporation of the water is avoided in the case of a slurry. The energy consumption of preliminary melting of the starting materials is avoided.

In one embodiment, the glass precursor mixture is prepared at a temperature between the ambient temperature and the ambient temperature increased by 20° C.

In one embodiment, the glass precursor mixture is prepared at a temperature of between +0 and +20° C. of the preliminary temperature of the water, sand, sodium carbonate and calcium oxide. A weighted mean may be taken as the preliminary temperature.

In one embodiment, the glass precursor mixture is prepared without introduction of heat energy. Drying-out of the mixture, which generates fines and thus batch dusts, is avoided.

In one embodiment, said mixture is fired in an electric furnace.

In one embodiment, a mixture of water, sand, soda and calcium oxide is introduced into a glassmaking furnace, the calcium oxide being in a mass proportion of between 1% and 20% of the total of the mixture, and the mixture is melted by means of at least one flame burner directed toward the mixture. Said burner offers a good yield and a glazing effect of the batch dusts toward the surface of the glass bath which is undergoing or which has undergone melting.

In one embodiment, the oxidant introduced into the burner is oxygen. The glazing effect of the batch dusts is increased.

In one embodiment, the water, sand, sodium carbonate and calcium oxide are present in mass proportions of between 0 and 5%, 40% and 65%, 1% and 25%, and 1% and 20%, respectively.

In one embodiment, the decarbonatation of the $Na_2CO_3$ is performed in the glassmaking furnace in the liquid phase.

The invention proposes an industrial glassmaking furnace comprising a molten glass tank, a combustion heating chamber located above the tank and delimited by breast walls, gables and a crown, a fume evacuation pipe in communication with the heating chamber, a loop burner placed in a direction parallel to the fume evacuation pipe, and a flame burner directed toward the molten glass tank.

In one embodiment, the flame burner is placed in a crown of the furnace.

In one embodiment, the glassmaking furnace is stationary. The fragility of rotating furnaces is avoided.

Tests reported below were conducted.

1) Temperature Test on a Batch of Soda-Lime Glass Precursor Mixture

Raw materials were weighed out for 20 kg of precursor mixture. The sand was dried and then rehumidified for a reproducible water content. The other raw materials are added simultaneously at time t0. Mixing is performed for 100 seconds in a concrete-type mixer. 16 kg are withdrawn and placed in a closed container. The temperature is recorded over 2 hours with a thermocouple placed at the center of the batch in the closed container. The water is the same for the 5 batches. The sand and the sodium carbonate come from the same industrial batches from the same suppliers. Five sources of calcium are compared:

limestone white quicklime A delivered in bulk, $D_{50}$ at 0.1 mm brown quicklime B delivered in bulk, $D_{50}$ at 0.1 mm quicklime C delivered in big bags of about 1 tonne, caliber 4/8 mm quicklime D, $D_{50}$ at 1.2 mm.

The notation $D_{50}$ means that 50% of the material by mass has a smaller particle size and 50% has a larger particle size. The caliber is a commercial notation indicating predominance of the particle size located in the range 4 to 8 mm.

The curves in FIG. 2 start at time $t=t_0+5$ minutes on account of the time for filling the container, for installing the thermocouple and for closing the container. The curves show a temperature increase of less than 5° C. with limestone, of about 15° C. with quicklime C delivered in big bags, of about 75° C. at $t=t_0+35$ minutes with the quicklime D, of about 75° C. at $t=t_0+12$ minutes with the white quicklime A delivered in bulk, of more than 90° C. at $t=t_0+30$ minutes with the brown quicklime B delivered in bulk.

The low heating with quicklime C may be explained by the very large particle size and by a preliminary moisture uptake which partly hydrated the quicklime and caused a loss in possible energy gain. A slaked lime introduced into a glassmaking furnace is dehydrated under the effect of heat, which has an impact on the energy balance by the energy required for the dehydration and the energy heating the additional water to the furnace temperature. However, a lime with a large particle size is less subject to involuntary hydration and the hydration is slower than with a lime of small particle size.

The differences in heating and in heating times between the quicklimes A and B delivered in bulk, white and brown, are explained by a different composition, without being very significant.

The three batches of tests which underwent substantial heating provide a mixture which generates a lot of batch dusts, i.e. of dusts that are partly lost by the suction of the chimneys and are not incorporated into the glass obtained. Moreover, the substantial heating makes the mixture difficult to handle for several hours. This substantial heating could be exploited to fire a hot mixture and improve the thermal balance of the glassmaking furnace. The gain would be of the order of 1% to 1.5%.

2) Test of Phasing of the Same Mixture

Following an unexpected interruption in handling, the quicklime was introduced into the mixture late. Mixing with water, sand and sodium carbonate has been made. The sand and the sodium carbonate come from the same industrial batches as in the first test. The lime is of 0/5 mm caliber. The lime was added 5 hours later and the rest of the test was performed as previously. No heating was recorded: see the lower curve in FIG. 3.

In the light of this result, the Applicant conducted two other tests, incorporating in one the same quicklime into a premix of water, sand and sodium carbonate, and in the other incorporating a premix of water, sand and sodium carbonate into the same quicklime without a delay between the manufacture of the premix and the incorporation: see the upper curves of FIG. 3. Significant heating in both cases, of about 40° C., then took place. The notion of "same" quicklime here is a quicklime from the same delivery from a manufacturer, thus having a very similar particle size, of 0/3 mm caliber, and identical storage conditions. The quicklime comes from sample No. 1 of the table in chapter 4.

A delay time in the preparation of the mixture with a delay in introduction of the lime is advantageous for avoiding the heating. The batch of mixture without heating was then loaded into a glassmaking furnace. The proportion of batch dusts was comparable to that of a glass produced from limestone.

3) Firing Test

Starting with the same soda-lime glass composition, the Applicant sought to compare different particle sizes of quicklime in the same furnace. The other raw materials are identical from one test to another. A quicklime of 0/5 mm caliber gave a glass production of 23 tons/day and a quicklime of 2/6 mm caliber from the same supplier gave a glass production of 20.5 tons/day. Said quicklimes originate from samples 4 and 6 of the table in chapter 4, respectively. A fine quicklime melts more quickly in the furnace than a coarse quicklime, but contains more air. The air must be evacuated from the melting glass by means of longer degassing.

Moreover, the Applicant prefers a quicklime containing a maximum amount of particles with a particle size of greater than 0.1 mm to avoid batch dusts, below a maximum value of between 4 and 6 mm for rapid melting, and relatively spread out between these limits to reduce the amount of air which is fired and which needs to be degassed from the glass.

In the glassmaking furnace, the mixture melted more quickly than a mixture of equivalent particle size based on limestone, of composition leading to a substantially identical glass. This acceleration is reflected by an increase in the daily production of a furnace of the order of 22%.

In tests conducted in the same laboratory furnace in the absence of dolomite, samples of melting glass were taken at 30 minute intervals from the furnace. Two batches of glass of the same composition based on the same limestone required 2 hours 30 minutes and 3 hours of heating to obtain correct melting. The samples taken prior to these times contain unmelted matter and, after cooling, break up into powder. A batch of glass of the same composition based on the same limestone precalcined at 1000° C. with a loss on ignition of 43.5%, a particle size of 0.1/2 mm and a batch of glass of the same composition based on quicklime C. The quicklime C comprises by mass: CaO 97.1%, MgO 1.8%, $SiO_2$ 0.5%, $Al_2O_3$ 0.2% and $Fe_2O_3$ 0.16 ppm. The quicklime C has a particle size of more than 50% not passing through the 3.15 mm screen; 18% not passing through the 2 mm screen after passing through the 3.15 mm screen; 18% not passing through the 2 mm screen after passing through the 3.15 mm screen; less than 5% not passing through the 1.6 mm screen after passing through the 2 mm screen; less than 5% not passing through the 0.8 mm screen after passing through the 1.6 mm screen; less than 5% not passing through the 0.5 mm screen after passing through the 0.8 mm screen; less than 5% not passing through the 0.315 mm screen after passing through the 0.5 mm screen; less than 5% not passing through the 0.2 mm screen after passing through the 0.315 mm screen; less than 5% not passing through the 0.1 mm screen after passing through the 0.2 mm screen; less than 10% not passing through the 0.08 mm screen after passing through the 0.1 mm screen; less than 5% passing through the 0.08 mm screen. The last two glass batches gave glass of suitable quality after 2 hours of heating. The absence of dolomite is a simplification that is not capable of changing the finding of the reduction in melting time.

4) Particle Size Measurement

| SCREEN mm | Lime No. 1 % retained | Lime No. 2 % retained | Lime No. 3 % retained | Lime No. 4 % retained | Lime No. 5 % retained | Lime No. 6 % retained | Lime No. 7 % retained | Lime No. 8 % retained |
|---|---|---|---|---|---|---|---|---|
| 4.000 | 0 | 0 | 0 | 3.3 | 19.6 | 6.9 | 17.8 | 24.4 |
| 3.150 | 0 | 0 | 0.1 | 2.3 | 25.1 | 10.7 | 18.3 | 19.3 |
| 2.000 | 18.1 | 15.9 | 6.9 | 9.1 | 35.4 | 22.9 | 25.6 | 21.8 |
| 0.800 | 37.2 | 32.7 | 22.9 | 20.1 | 8.1 | 19.4 | 13.6 | 11.3 |
| 0.500 | 10.9 | 10.5 | 11.5 | 8.8 | 1.2 | 5.5 | 3.2 | 2.6 |
| 0.400 | 3.9 | 3.5 | 4.5 | 3.5 | 0.3 | 1.9 | 1.1 | 1.0 |
| 0.200 | 9.7 | 19.8 | 15.7 | 10.5 | 0.9 | 5.3 | 3.1 | 3.0 |
| 0.100 | 8.3 | 13.5 | 27.9 | 23.3 | 1.0 | 7.9 | 10.9 | 8.8 |
| Remainder | 20.8 | 4 | 9.9 | 18.5 | 8.2 | 19.3 | 6.2 | 7.6 |

| SCREEN mm | Lime No. 9 % retained | Lime No. 10 % retained | Lime No. 11 % retained | Lime No. 12 % retained | Lime No. 13 % retained | Lime No. 14 % retained | Lime No. 15 % retained | Lime No. 16 % retained |
|---|---|---|---|---|---|---|---|---|
| 4.000 | 29.5 | 4.0 | 0.2 | 0.1 | 1.3 | 0.8 | 0.9 | 0.9 |
| 3.150 | 21.5 | 3.4 | 1.3 | 0.5 | 1.0 | 0.8 | 1.4 | 1.3 |
| 2.000 | 22.4 | 15.0 | 4.3 | 9.1 | 10.0 | 2.9 | 5.5 | 3.9 |
| 0.800 | 15.2 | 32.8 | 13.1 | 26.7 | 29.8 | 12.7 | 15.3 | 14.6 |
| 0.500 | 2.6 | 12.9 | 8.2 | 14.6 | 14.9 | 9.7 | 10.1 | 9.8 |
| 0.400 | 0.7 | 4.2 | 3.6 | 5.5 | 4.4 | 3.9 | 3.6 | 3.9 |
| 0.200 | 1.8 | 10.1 | 12.2 | 16.9 | 13.0 | 13.2 | 14.2 | 11.8 |
| 0.100 | 4.2 | 13.8 | 34.9 | 12.6 | 13.6 | 24.8 | 31.7 | 40.8 |
| Remainder | 2.1 | 3.6 | 22.0 | 14.0 | 11.9 | 30.5 | 17.2 | 11.8 |

These particle size measurements show that this parameter changes as a function of the packaging of the lime—big bags, bulk, etc. —, the handling and movement of the lime, and the storage conditions and time. The desired particle size comprises the largest possible number of particles between 0.1 mm and 4 mm, for example 90% by mass not passing through the 0.1 mm screen and less than 5% by mass not passing through the 4 mm screen. A preferred particle size is: more than 95% by mass not passing through the 0.1 mm screen and less than 1% by mass not passing through the 4 mm screen.

5) Amount of Batch Dusts

The flue of an industrial glassmaking furnace was equipped with a shunt for recovering and weighing a portion of the batch dusts. The same shunt device was used during the test run. The tests were conducted with, at the start, the same raw materials except for changing the limestone to CaO and obtaining a glass of the same composition at the outlet and over a time of 24 hours. A first series of tests was conducted with a conventional mixture comprising limestone and a loop furnace with a crown burner. A second series of tests was conducted with a mixture comprising quicklime No. 4 and the loop furnace with a crown burner. The composition of the mixture is 1367 kg of sand, 112 kg of dolomite, 416 kg of sodium carbonate, 4 kg of sodium sulfate, 160 kg of quicklime, 30 kg of alumina. The amounts of batch dusts recovered constitute relative measurements for mutual comparison. They were not expressed relative to the tonne of glass produced. These are raw values in grams:

Series No. 1: mean: 43.15; standard deviation: 14.65. The dusts collected are due to two effects: the flying of particles and the vaporization and then recondensation of the gaseous species on the cold finger which was placed in the flue to recover the dusts. This second effect was identified by the Applicant.

Series No. 2: mean: 45.2; standard deviation: 7.85. The analysis made for series No. 1 applies. The flue did not need to be cleaned during a run of eleven months. The dusts recovered predominantly contain sodium sulfate, which is easier to clean than the calcium sulfate usually found in the flue. It is deduced therefrom that the loss of Ca in the batch dust is reduced.

In conclusion, measurement of the amount of particles in the flue is difficult and an interpretation is necessary. Under the test conditions, the use of CaO derived from the calcination of limestone does not generate the same batch dusts of particles in the furnace as the use of $CaCO_3$ with the crown burner.

After its tests, the Applicant developed the preparation of a precursor mixture of glass for a glassmaking furnace, in which, firstly, water, sand and sodium carbonate are mixed in mass proportions of between 0 and 5%, 40% and 65%, and more than 0 and not more than 25%, respectively, and, secondly, calcium oxide is added in a mass proportion of between 1% and 20% of the total. The addition of CaO is performed at least one hour after the first mixing. The materials are at the ambient temperature. The water is absorbed by the sodium carbonate and becomes sparingly available for the CaO.

Water permits reduced sensitivity to the batch dusts by means of the effect of cohesion on the fine particles.

The precursor mixture contains for a soda-lime glass: water 0 to 3%, sand 65% to 75%, sodium carbonate 10% to 15%, quicklime 10% to 25%, magnesia 0 to 6%, refining agents, colorants and decolorizers 0 to 2%.

A borosilicate glass contains: 7% to 13% of boron trioxide ($B_2O_3$), 4% to 8% of alkaline oxides ($Na_2O$; $K_2O$), 2% to 7% of alumina ($Al_2O_3$), 0 to 5% of other alkaline oxides (CaO, MgO, etc.). A borosilicate glass containing CaO may be manufactured from a precursor mixture according to the invention.

BRIEF DESCRIPTION OF THE DRAWINGS

Other features and advantages of the invention will become apparent on examining the detailed description below, and the appended drawings, in which:

FIG. 7 shows a selection of the curves of FIG. 4 on the particle size parameter of the sodium carbonate.

Figure 1:
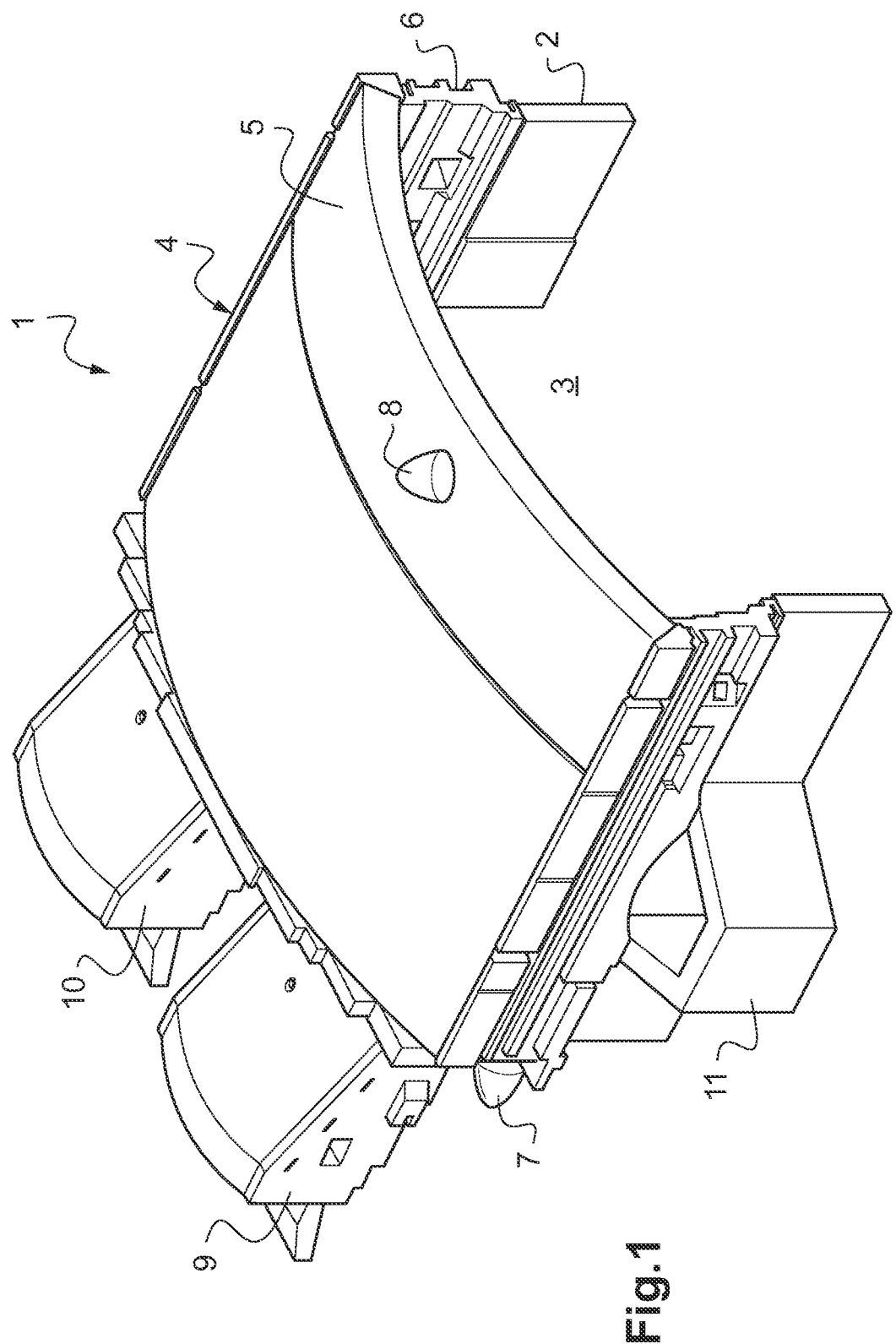
FIG. 1 is a schematic perspective view of a glassmaking furnace according to one embodiment.
Figure 2:
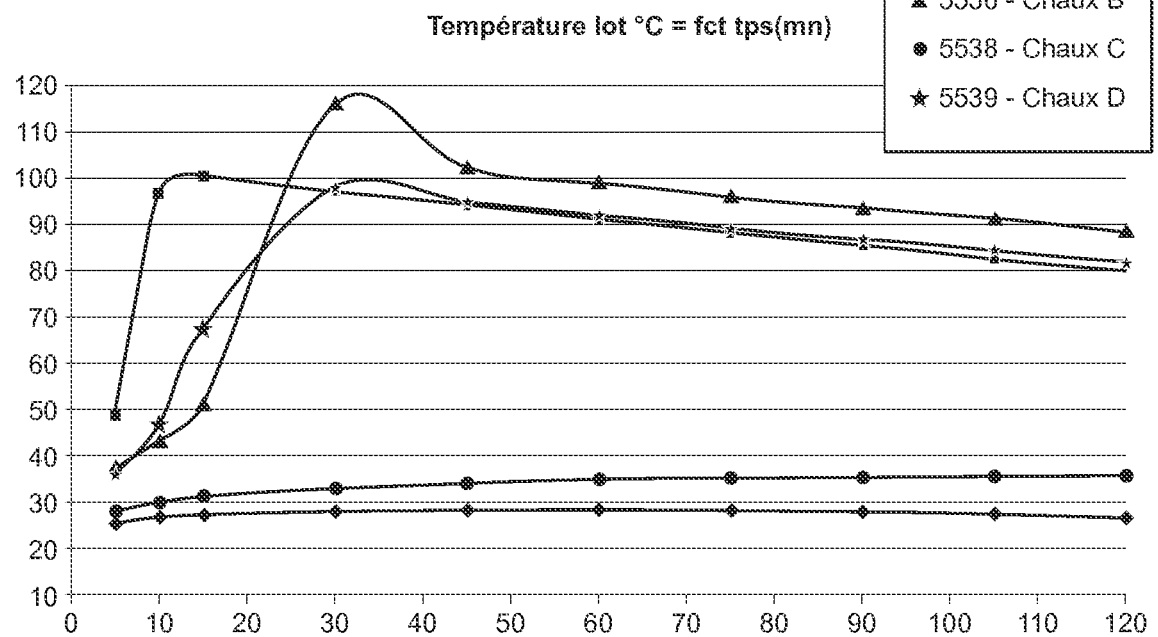
FIG. 2 shows curves of heating as a function of time for limestone and quicklime.
Figure 3:
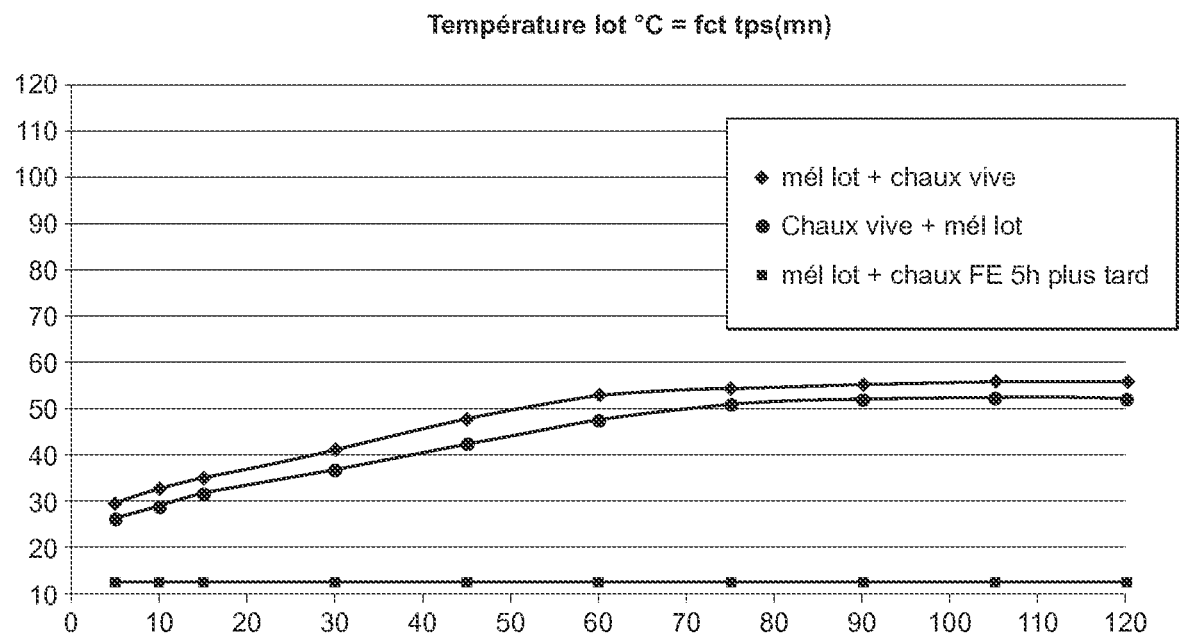
FIG. 3 shows curves of heating as a function of time for three mixtures containing lime.

The appended drawings may serve not only to complete the invention, but also to contribute toward its definition, where appropriate.

DETAILED DESCRIPTION OF THE PREFERRED EMBODIMENTS

The glassmaking furnace 1 has at least one loop burner and at least one crown burner. The loop burner is oriented substantially horizontally, close to an oxidant inlet. The flame extends substantially horizontally over the bath. The bath is composed at the start of heating of the starting materials to be melted, i.e. of the glass precursor mixture, and then of the molten glass undergoing production, gradually transformed into industrial glass having the desired quality. The crown burner is oriented substantially vertically in a summit wall of the furnace. The flame extends substantially vertically toward the bath.

The glassmaking furnace 1 comprises a molten glass tank 2 for a batch production. The glassmaking furnace 1 comprises a combustion chamber 3 located above the molten glass bath and an upper wall 4 composed of a crown 5 and vertical parts known as the breast walls (length) or gables (width) 6 delimiting the combustion chamber 3. The glassmaking furnace 1 comprises at least one loop burner 7 fed with fuel oil or gas. The glassmaking furnace 1 comprises at least one crown burner 8 fed with fuel oil or gas. The glassmaking furnace 1 comprises an oxidant inlet 9. The oxidant may be air and/or oxygen.

The burner 8 is installed in the crown 5. The burner 8 is a flame burner directed toward the upper surface of the bath, from the top downward. The burner 8 is positioned so that its flame is located outside the zone where the movement of gas generated by the burner 7 is maximal. The burner 8 is positioned substantially at the top of the crown 5. The burner 8 is positioned substantially in the middle of the furnace 1 in the direction of the length.

An aperture or nook 11 for feeding the furnace 1 with raw materials to be melted, notably with precursor mixture, is provided in one of the breast walls. The members for withdrawing the refined glass have not been shown.

The tank 2 and the upper wall 4 are made of refractory materials, reinforced with an outer metallic structure remote from the high-temperature zones. The burner 7 is a flame burner oriented horizontally in the combustion chamber 3. The burner 7 is installed below the oxidant inlet 9.

The glassmaking furnace 1 comprises a fume outlet 10 housed in one of the vertical walls 6 above the molten glass bath. The burner 7 and the fume outlet 10 may be provided on the same small side so that the flame of said burner 7 and the fumes follow a U shaped path in the combustion chamber 4. The U shaped path is referred to as a loop path in the usual jargon. The burner 7 and the fume outlet 10 may be parallel. The burner 7 and the fume outlet 10 emerge in the combustion chamber 3.

Downstream of the fume outlet 10 in the direction of movement of the fumes, the installation may comprise a flue. The flue is a substantially horizontal fume pipe. The flue is in fluid communication with the combustion chamber 3 via the fume outlet 10. The flue is made of refractory materials reinforced with an outer metallic structure which is remote from the high-temperature zones. The flue is free of valves. The flue conducts the fumes to a chimney or a heat recovery device or a regenerator for heating the oxidant.

The combined use of the loop burner 7 and of the crown burner 8 offers a high yield and glazing of the surface of the bath. The glazing is rapid melting of the surface zone of the bath subjected to the action of the flame of the crown burner 8. Rapid melting prevents the release of dusts from said zone. Glazing is obtained more quickly.

Figure 4:
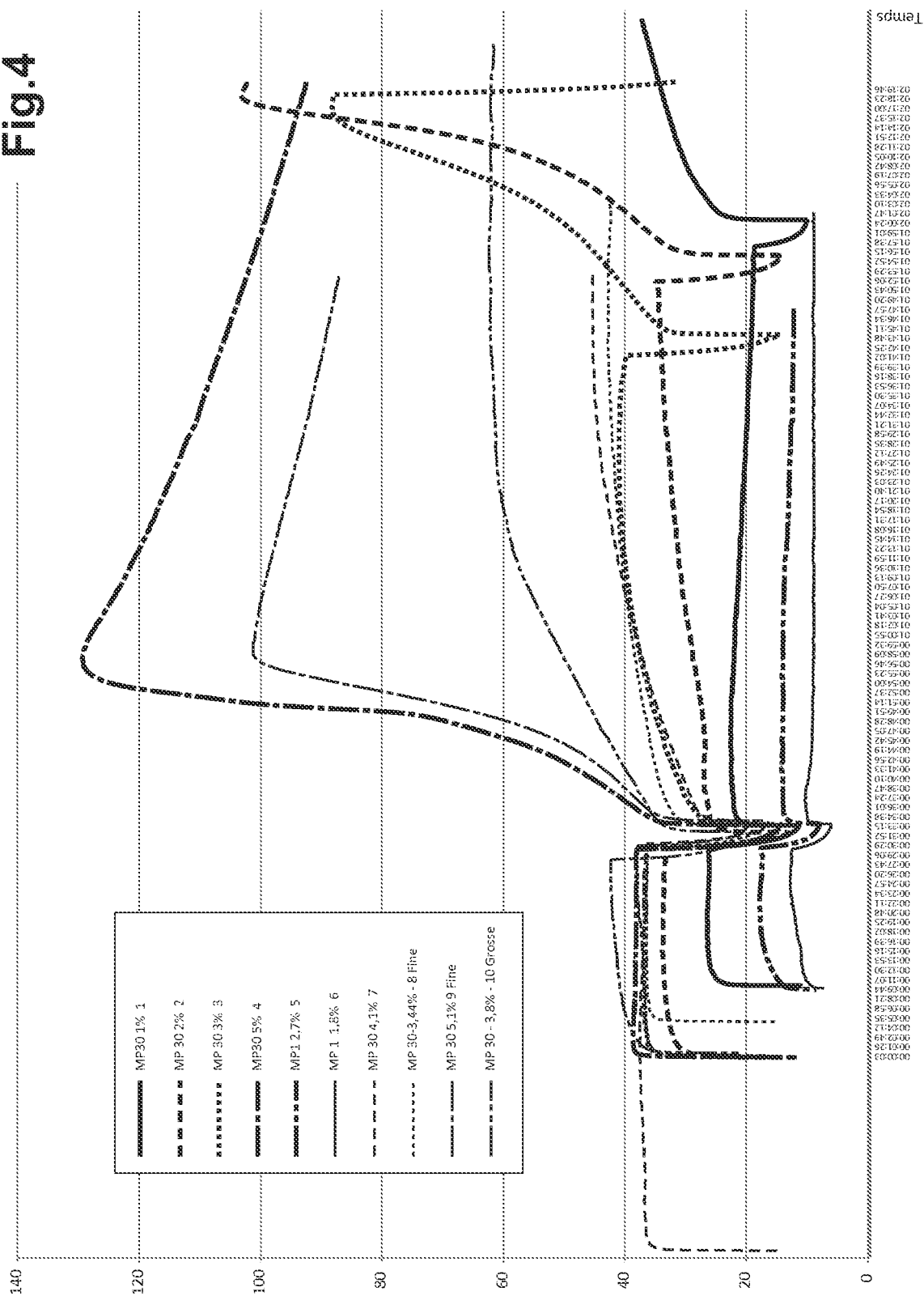
FIG. 4 shows several curves of heating as a function of time for ten tests as a function of the temperature of the starting materials, of the moisture content, of the delay between premixing and the introduction of the quicklime, and of the particle size of the sodium carbonate.
Figure 5:
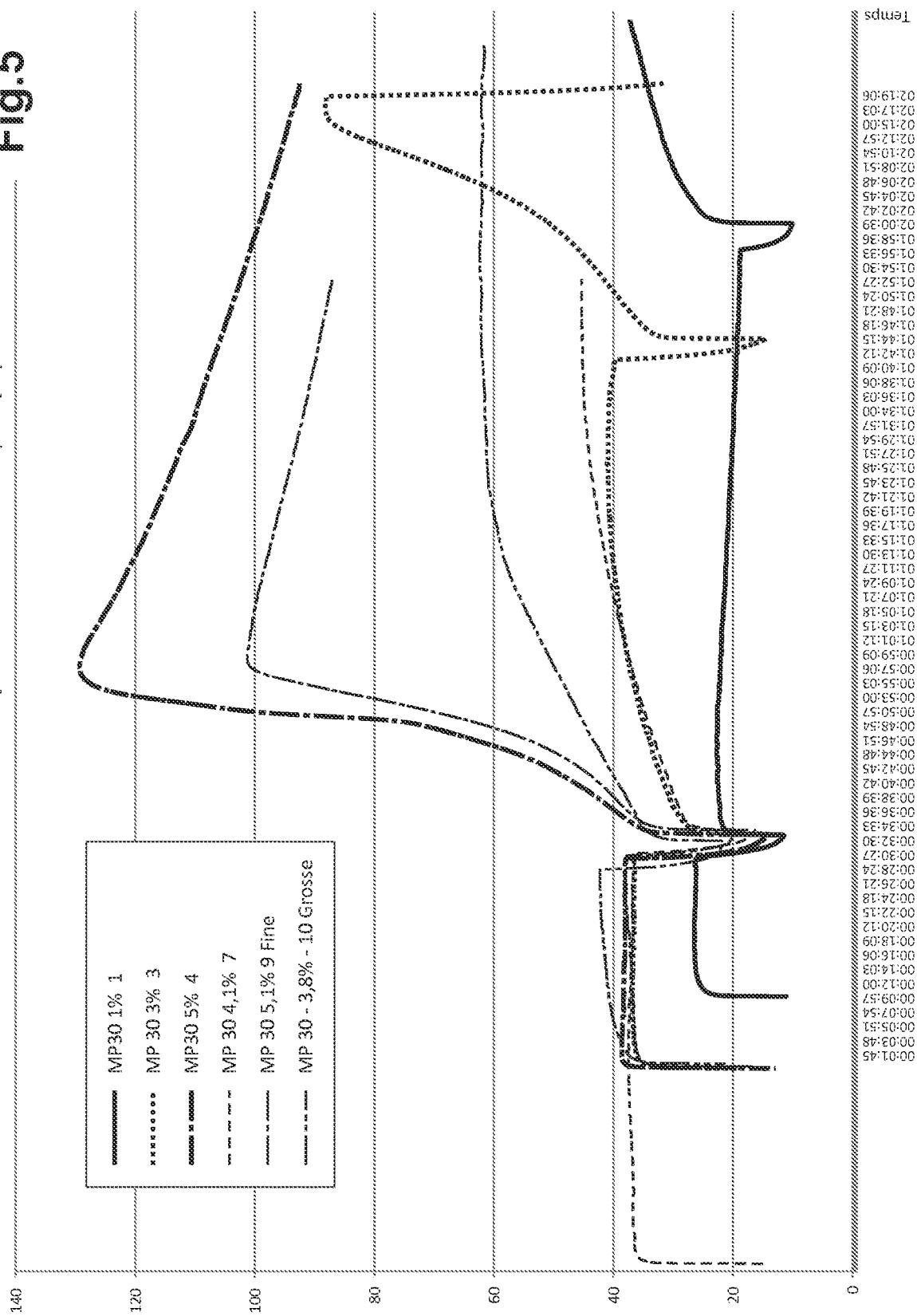
FIG. 5 shows a selection of the curves of FIG. 4 on a moisture content parameter.
Figure 6:
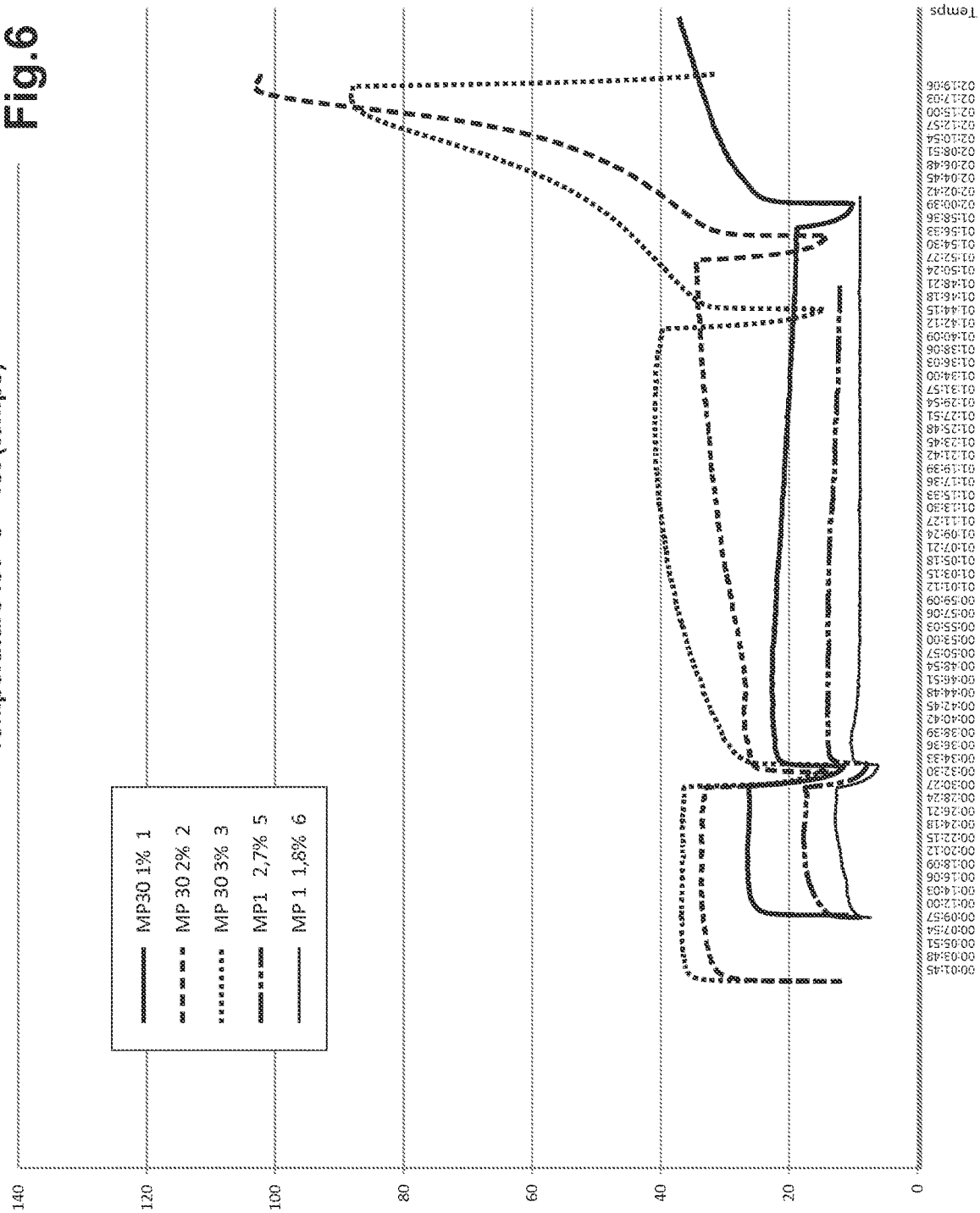
FIG. 6 shows a selection of the curves of FIG. 4 on the temperature parameter.

Moreover, tests relating to the delay time D between the mixing (the action of mixing) of the water, the sand and the calcium carbonate and the addition of calcium oxide (quicklime) were conducted in relation with the temperature $T_{sm}$ of the starting materials corresponding to the mean ambient storage temperature and the moisture content H of the sand/soda mixture measured. Alumina, for example in the form of feldspath, feldspathoid and/or calcined alumina is also mixed with the water, sand and sodium carbonate. These tests are reported in FIGS. 4 to 7. The temperature measured is on the y axis and the time on the x axis. The curves were set on the x axis on a common reference at the moment of introduction of the quicklime into the mixture containing a premix beforehand. The delay D goes from 20 minutes for tests 1, 5 and 6 to 60 minutes for test 7.

Here, the water was supplied to a dry sand and mixed for 3 minutes. Next, sodium carbonate and alumina were mixed with the wet sand for 2 minutes. Measurement of the moisture content H and of the temperature T of the premix was performed. The water present before the introduction of the sodium carbonate and the alumina reacts with the sodium carbonate via a hydration reaction of the sodium carbonate, with a rise in temperature of a few degrees. The sodium carbonate reacts with said water at least in the tests of curves 1 to 3. Free water remains in the test of curve 4 since the subsequent addition of calcium oxide brings about a strong and vigorous temperature increase. Substantially no free water remains in the tests of curves 1 to 3 since the subsequent addition of calcium oxide does not bring about any temperature increase. Furthermore, supplying water, as a check, more than one hour after the addition of calcium oxide brings about a strong and vigorous temperature increase.

Later, the calcium oxide was added and mixed. The mixing action was performed in a mixer of concrete mixer type with a volume of 150 liters. The amounts used in each test are: 19 to 20 kg. The nature and origin of the starting materials are the same for tests 1 to 10. Finally, tests 1 to 10 were performed by the same person following the same protocol, with the same concrete mixer at the same rotation speed. The taking of the measurement and the measurement precision correspond to semi-industrial tests that are closer to the reality of a production run than a fundamental research laboratory, one aim being to identify phenomena that take place at the industrial scale. The masses used are 13 kg of sand, 4 kg of sodium carbonate, 2 kg of calcium oxide, 0.24 kg of alumina and water to reach the desired percentage.

The sand has a composition: $SiO_2$ at least 99%, $Al_2O_3$ less than 1%, $K_2O$ less than 0.1%, $TiO_2$ less than 0.03%, $Fe_2O_3$ less than 0.015%. The other elements are in trace amount. The sand has a particle size $D_{50}$ of between 0.20 and 0.25 mm. The sand has a particle size with not more than 3% of screen retainings of 0.355 mm, and not more than 1% of passage through a 0.125 mm screen.

The sodium carbonate has a composition: $Na_2CO_3$ 99.75%, NaCl 0.03% and $H_2O$ less than 0.1%. The other elements are in trace amount. The sodium carbonate has a particle size $D_{50}$ of between 0.15 and 0.25 mm. The sodium carbonate has a particle size with not more than 0.5% of screen retainings of 0.600 mm, at least 90% of screen retainings of 0.150 mm and not more than 2% of passage through a 0.075 mm screen.

The calcium oxide has a composition: CaO at least 93%, MgO less than 2%, $CO_2$ less than 2%, $Fe_2O_3$ less than 0.1%, S less than 0.06%. The other elements are in trace amount. The calcium oxide has a particle size $D_{50}$ of between 0.08 and 0.12 mm. The calcium oxide has a particle size with not more than 1.6% of screen retainings of 5.00 mm, and not more than 55% of passage through a 0.090 mm screen.

The maximum temperature $T_{max}$ reached within the hour following the addition of calcium oxide is measured. The temperature measurement is performed by inserting a temperature probe into the mixture contained in the mixer, the mixer having been switched off. The first temperature clip observed on all the curves in FIG. 4 corresponds to the step of withdrawing the temperature probe, addition of the calcium oxide, switching on the mixer for 2 minutes, inserting the temperature probe again. The second temperature clip observed in curves 1, 2 and 3 corresponds to an additional step of adding excess water beyond the amounts indicated to check the presence of calcium oxide more than one hour after the introduction of said calcium oxide. This addition of water is reflected by an exothermic reaction of hydration of the calcium oxide, transforming it into calcium hydroxide. The temperature rise observed after said addition of excess water makes it possible to deduce that the calcium oxide remained present beforehand in the mixture.

Furthermore, fine observation of all of the curves before the addition of calcium oxide shows a temperature increase indicating a water-sodium carbonate reaction. The temperature reached rises with the proportion of water, notably by comparison between curves 1, 2, 3, 7 and 4, on the one hand, and 6 and 5, on the other hand.

Before the addition of calcium oxide, a temperature maximum is reached, i.e. very rapidly for curve 4 in about 1 minute after the end of the mixing action, i.e. about 3 minutes after placing the sodium carbonate and the alumina in contact with the sand and the water, i.e. more slowly for the other curves in about 10 minutes after the end of the mixing action. The temperature reduction after the maximum indicates that the water-sodium carbonate reaction has ceased. The end of said reaction indicates that either all the available water has been taken up, or that all the available sodium carbonate has been hydrated and there is free water remaining. Thus, the rapid reaction of curve 4 corresponds to the hydration of the sodium carbonate with excess water.

After the addition of the calcium oxide, the temperature is measured:

D=20 minutes $T_{sm}$=30° C. H=1%. $T_{max}<T_{rm}$+15° C.
D=30 minutes $T_{sm}$=30° C. H=2%. $T_{max}<T_{rm}$+15° C.
D=30 minutes $T_{sm}$=30° C. H=3%. $T_{max}<T_{rm}$+15° C.
D=30 minutes $T_{sm}$=30° C. H=5%. $T_{max}$>100° C.
D=20 minutes $T_{sm}$=1° C. H=2.7%. $T_{max}<T_{rm}$+15° C.
D=20 minutes $T_{sm}$=1° C. H=1.8%. $T_{max}<T_{rm}$+15° C.
D=60 minutes $T_{sm}$=30° C. H=4.1%. $T_{max}<T_{rm}$+15° C.
D=25 minutes $T_{sm}$=30° C. H=3.44%. $T_{max}<T_{rm}$+15° C.
D=30 minutes $T_{sm}$=30° C. H=5.1%. $T_{max}$>100° C.
D=30 minutes $T_{sm}$=30° C. H=3.8%. $T_{max}$>60° C.

Heating below 10° C. takes place on mixing (the action of mixing) the water-sand-sodium carbonate in tests 2 to 4 and 7. Tests 4, 9 and 10 are unsatisfactory due to excessive heating on introduction of the calcium oxide. Comparison of tests 2 and 6, on the one hand, and 3 and 5, on the other hand, shows that the initial temperature of the raw materials $T_{rm}$ has little to no influence on the maximum temperature $T_{max}$. Comparison of tests 2, 3 and 4, on the one hand, and 5 and 6, on the other hand, shows that the moisture content has little influence below a threshold. The threshold is located between more than 4.1% and less than 5% for D=30 minutes. However, the influence of the duration D has an upper limit set by the ability of the sodium carbonate to absorb the available free water. However, the tests show that the amount of water must be largely inferior to the theoretical maximum threshold.

Moreover, the particle size of the sodium carbonate has an influence on the duration D. To a certain extent, the finer the particle size, the more quickly the water is absorbed but there is a risk of initiating setting to a solid. In the event of setting to a solid, the water remains available for the quicklime, whence heating that it is desired to avoid.

In the case of a high particle size of the sodium carbonate, the Applicant puts forward the hypothesis that the reaction with water is limited, said reaction taking place at the surface of the sodium carbonate grains but sparingly or not at all inside said grains. The particle size of the sand has little influence on account of the virtually nonexistent ability of $SiO_2$ to become hydrated.

Test No. 2 was performed with a cold concrete mixer, at about 0° C., which slowed down the sodium carbonate hydration reaction. Test No. 2 is not entirely representative in the curve section prior to the addition of calcium oxide. In general, an energy input may be performed in the form of heating the concrete mixer and/or mixing at a higher temperature than the ambient temperature, for example with a flame burner, electric heating, or injection of steam into the mixture, while remaining at a mixing temperature below 47° C.

Thus, the tests with 4.1% moisture content in the mixture prior to the addition of quicklime for a duration D of at least one hour and at 3% moisture content for a duration D of at least 10 minutes with a common sodium carbonate particle size offer satisfactory results. The low influence of the duration D beyond 10 minutes on account of the temperature maximum reached before 10 minutes, is such that a maximum of 4.1% moisture content in the mixture prior to the addition of quicklime for a duration D of 10 minutes is advantageous and would even be versatile relative to measurement imprecisions or industrial tolerances.

Analysis of the left part of the curves provides information. Between time 0 and the moment of withdrawal of the probe for the purpose of supplying CaO—at 20; 30; 60 minutes depending on the tests—the change in temperature reflects the sodium carbonate hydration reaction on contact with the wet sand. Between these moments, a time period is identified in which the local temperature maximum $T_{Na}$ is found. The local temperature maximum $T_{Na}$ indicates that the sodium carbonate hydration reaction has substantially terminated:

D=20 minutes $T_{rm}$=30° C. H=1%. $T_{Na}$ 5 to 7 minutes.
D=30 minutes $T_{rm}$=30° C. H=2%. $T_{Na}$ 13 to 15 minutes.
D=30 minutes $T_{rm}$=30° C. H=3%. $T_{Na}$ 5 to 7 minutes.

D=30 minutes $T_{rm}$=30° C. H=5%. $T_{Na}$ 1 to 2 minutes.
D=20 minutes $T_{rm}$=1° C. H=2.7%. $T_{Na}$ 11 to 13 minutes.
D=20 minutes $T_{sm}$=1° C. H=1.8%. $T_{Na}$ about 15 minutes.
D=60 minutes $T_{sm}$=30° C. H=4.1%. $T_{Na}$ 17 to 19 minutes.
D=25 minutes $T_{sm}$=30° C. H=3.44%. $T_{Na}$ 7 to 9 minutes.
D=30 minutes $T_{sm}$=30° C. H=5.1%. $T_{Na}$>25 minutes.
D=30 minutes $T_{sm}$=30° C. H=3.8%. $T_{Na}$ 25 to 27 minutes.

The initial temperature $T_{rm}$ of the starting materials has an influence on the rate of the water-sodium carbonate reaction. At $T_{rm}$=30° C., the reaction is faster than at $T_{rm}$=1° C. by comparison between tests 2 and 6; 3 and 5. The speed of the reaction in test No. 4 corroborates a presence of excess water enabling faster hydration of the sodium carbonate. The relative slowness of the reaction in test No. 7 shows a water-sodium carbonate equilibrium. The stability between tests No. 1 and No. 3 shows that a duration D of about 10 minutes is sufficient and robust with raw materials at an initial temperature of 30° C. or more. Such a stability between tests No. 1 and No. 3, and between tests No. 6 and No. 5 shows that, with sodium carbonate in excess relative to water, the reaction speed is sparingly dependent on the water content.

Moreover, during the subsequent addition of excess water in tests 2 and 3 and during the addition of calcium oxide in test 4, the temperature increased very rapidly and a strong evolution of dusts took place simultaneously. The right side of the curve in test 1 starting from 1:49:20 is not representative for reasons intrinsic to test 1. This type of reaction is typical of the hydration of quicklime, which is a highly exothermic reaction. The immediate hydration of the quicklime added to a mixture containing 5% water and the absence of hydration of quicklime added to a mixture containing 2% or 3% water are thus confirmed. In addition, the temperature curves of tests 3 and 7 containing 3% and 4.1% water, respectively, have very similar shapes before and after the addition of quicklime. This strong similarity indicates that the mixture containing 4.1% water does not contain any free water.

Tests 8 and 9 were conducted with sodium carbonate fines passing through a 0.250 mm screen whereas test 10 was conducted with coarse sodium carbonate particles not passing through a 0.500 mm screen and passing through a 1.000 mm screen. The origin and batch of sodium carbonate are the same for tests 1 to 7. Screening was performed.

Tests 8 and 10 were chosen with a moisture content suggesting a satisfactory result, whereas test 9 was chosen with a high moisture content to test the possible influence of the particle size on the maximum moisture content. The curve of test 8 is close to the curve of test 3. Test 8 is interpreted as producing total consumption of the free water by the sodium carbonate in a relatively short time of less than 10 minutes and a temperature increase of less than 15° C. relative to the initial temperature $T_{rm}$. The fine particle size does not have any major impact at the moisture content of 3.44%. Test 9 at a high moisture content reveals a much slower sodium carbonate hydration reaction than in test 4. This is explained by the setting to a solid of the precursor mixture accompanied by crusting phenomena liable to slow down the reaction.

Test 10 at a large particle size and 3.8% moisture content gives a curve different from the other tests in the sodium carbonate hydration step. The temperature rises for more than 25 minutes, which indicates continuation of the sodium carbonate hydration reaction. During the withdrawal of the temperature probe for the purpose of introducing the calcium oxide, an uncertainty remains regarding whether or not the temperature maximum has been reached. The slowness of the sodium carbonate hydration results in a reduced available active surface of the sodium carbonate on account of the large particle size of the sodium carbonate.

During the addition of calcium oxide, test 8 shows a temperature increase comparable to that of tests 3 and 7, which is thus satisfactory. The presence of available water to hydrate the calcium oxide is very low. Test 9 shows a temperature increase comparable to that of test 4, which is thus too high. Decreasing the particle size does not afford any advantageous effect in the step of adding calcium oxide and presents risks of setting to a solid. Such risks may be reduced by selecting a moisture content of 2% or less.

During the addition of calcium oxide, test 10 shows a temperature increase of about 30 to 35° C. above the temperature $T_{rm}$. This increase leads to a temperature above 60° C. starting from $T_{rm}$=30° C. At 60° C., the risk of releasing irritant dusts is high. Increasing the particle size provides a risk of excessive heating on addition of the calcium oxide, in particular if the temperature $T_{rm}$ is greater than 15° C. Such a risk may be reduced by selecting a moisture content of 3% or less.

The absence of benefit and certain drawbacks of the exclusively fine and exclusively coarse particle sizes are deduced from tests 8 to 10. It is thus preferable to provide a source of sodium carbonate with a particle size centered between 0.250 mm and 0.500 mm. This may include minor fractions of particles, some of which are less than 0.250 mm and others greater than 0.500 mm, as shown by tests 1 to 7. Thus, a sodium carbonate particle size with less than 5% passing through a 0.075 mm screen, less than 15% passing through a 0.150 mm screen and less than 5% not passing through a 0.600 mm screen is suitable for use.

In the case of supplying sodium carbonate with a high particle size, then the moisture content will be limited to 3%. The hydration of the sodium carbonate will be faster than in test 10 and the temperature after introduction of the calcium oxide will remain within a range of +0 to +15° C. relative to the ambient temperature.

The invention claimed is:

1. A process for manufacturing glass comprising:
   preparing a glass precursor mixture for a glassmaking furnace, in which water, sand and sodium carbonate are mixed in mass proportions of between more than 0 and 5%, 40% and 65%, and more than 0 and not more than 25%, respectively, and,
   adding, after a delay of at least 10 minutes, calcium oxide in a mass proportion of between 1% and 20% of the total,
   wherein the glass precursor mixture is prepared and the calcium oxide is added without supplying thermal energy.

2. The process as claimed in claim 1, wherein said delay is at least one hour.

3. The process as claimed in claim 1, wherein said delay is between at least 10 minutes and less than one hour for a mixture of water, sand and sodium carbonate with a moisture content of not more than 4.1%.

4. The process as claimed in claim 1, wherein the sodium carbonate has a particle size of less than 5% passing through a 0.075 mm screen, less than 15% passing through a 0.150 mm screen and less than 5% not passing through a 0.600 mm screen.

5. The process as claimed in claim 1, wherein said mixture of water, sand and sodium carbonate has a moisture content of not more than 3% with sodium carbonate of particle size predominantly greater than 0.500 mm and less than 1.000 mm and a moisture content of not more than 2% with sodium carbonate of particle size predominantly less than 0.250 mm.

6. The process as claimed in claim 1, wherein said delay is less than 72 hours and an initial temperature of the raw materials to be mixed is at least 30° C.

7. The process as claimed in claim 1, wherein the calcium oxide has a particle size such that 70% to 90% by mass does not pass through a 0.1 mm screen.

8. The process as claimed in claim 1, wherein the calcium oxide has a particle size such that more than 90% by mass does not pass through a 0.1 mm screen and less than 5% by mass does not pass through a 4 mm screen.

9. The process as claimed in claim 1, wherein the calcium oxide has a mean particle size of between 1 and 5 mm.

10. The process as claimed in claim 1, wherein the precursor mixture is used in a glassmaking furnace less than 1 hour after its preparation for a particle size of 90% or more by mass passing through a 0.1 mm screen.

11. The process as claimed in claim 1, wherein the precursor mixture is used in a glassmaking furnace less than 8 hours after its preparation for a particle size of 70% or more by mass passing through a 2 mm screen.

12. The process as claimed in claim 1, wherein said sand is dry.

13. The process as claimed in claim 1, wherein the water is present in said sand, preferably to 3% to 4% by mass.

14. The process as claimed in claim 1, wherein the calcium oxide is free of deliberate addition of aluminum oxide.

15. The process as claimed in claim 1, wherein cullet is added to the glass precursor mixture, before or after the addition of calcium oxide, in a mass proportion of between 5% and 40% of the total.

16. The process as claimed in claim 1, wherein the glass precursor mixture is prepared in the solid state.

17. The process as claimed in claim 1, wherein the glass precursor mixture is prepared at a temperature between ambient air temperature and the ambient air temperature increased by 20° C.

18. The process as claimed in claim 1, wherein said mixture is fired in an electric furnace.

19. The process as claimed in claim 1, further comprising:
introducing the glass precursor mixture into a glassmaking furnace, and
melting the mixture with at least one flame burner directed toward the mixture.

20. The process as claimed in claim 19, wherein an oxidant supplied to the burner is oxygen.

21. The process as claimed in claim 19 wherein the water, sand, sodium carbonate and calcium oxide are present in mass proportions of between 0 and 5%, 40% and 65%, 1% and 25%, and 1% and 20%, respectively.

22. An industrial glassmaking furnace for performing the process as claimed in claim 1, comprising a molten glass tank, a combustion heating chamber located above the tank and delimited by breast walls, gables and a crown, a fume evacuation pipe in communication with the heating chamber, a loop burner placed in a direction parallel to the fume evacuation pipe, and a flame burner directed toward the molten glass tank.

23. The furnace as claimed in claim 22, wherein the flame burner is placed in a crown of the furnace.

24. The furnace as claimed in claim 22 wherein an oxidant is oxygen.

* * * * *